United States Patent [19]

Dailey

[11] Patent Number: 5,589,716
[45] Date of Patent: Dec. 31, 1996

[54] LIGHT-GOVERNED WINDSHIELD WIPER AND HEADLIGHT CONTROL SYSTEM WITH PROVISION FOR MAINTAINING THE HEADLIGHTS ON WITH INSUFFICIENT AMBIENT LIGHT

[76] Inventor: Gyles B. Dailey, 820 Dogwood Dr., New Ellenton, S.C. 29809

[21] Appl. No.: 531,321

[22] Filed: Sep. 20, 1995

[51] Int. Cl.$^6$ ............................................. B60L 1/14
[52] U.S. Cl. .................................... 307/10.8; 315/83
[58] Field of Search ................... 307/10.1, 10.8; 315/77, 82, 83; 361/160, 170, 173–177

[56] References Cited

U.S. PATENT DOCUMENTS

| | | | |
|---|---|---|---|
| 3,879,617 | 4/1975 | Faller | 307/10.8 |
| 3,909,619 | 9/1975 | Kniesly et al. | 307/10.8 |
| 4,236,099 | 11/1980 | Rosenblum | 315/83 |
| 5,457,347 | 10/1995 | Ruter | 307/10.8 |

*Primary Examiner*—William M. Shoop, Jr.
*Assistant Examiner*—Richard T. Elms

[57] ABSTRACT

A light-governed windshield wiper and headlight control system including a headlight switching mechanism and wiper switching mechanism. The wiper switching mechanism is coupled to windshield wipers and both switching mechanisms have a first orientation allowing direct current to flow from a power source and a second orientation for withholding direct current therefrom. A relay control mechanism is coupled between the wiper switching mechanism, headlight switching mechanism, power source, and headlights of an automobile. The relay control mechanism has a first orientation for allowing activation of the headlights via the headlight switching mechanism, and further has a second orientation actuated by the wiper switching mechanism for allowing coincident activation of the headlights and windshield wipers. Finally, a light-governed switch is coupled to the relay control mechanism allowing continued operation of the headlights despite deactivation of wiper switching mechanism when there is insufficient light.

2 Claims, 2 Drawing Sheets

LIGHT-GOVERNED WINDSHIELD WIPER AND HEADLIGHT CONTROL SYSTEM WITH PROVISION FOR MAINTAINING THE HEADLIGHTS ON WITH INSUFFICIENT AMBIENT LIGHT

BACKGROUND OF THE INVENTION

1. Field of the Invention

The present invention relates to a new and improved light-governed windshield wiper and headlight control system and, more particularly, pertains to a control system which automatically actuates the headlights of an automobile upon activation of the windshield wipers. The invention further precludes deactivation of the headlights upon deactivation of the windshield wipers when there is insufficient light.

2. Description of the Prior Art

The use of windshield wiper actuated headlights is known in the prior art. More specifically, windshield wiper actuated headlights heretofore devised and utilized for the purpose of activating headlights upon activation of windshield wipers are known to consist basically of familiar, expected, and obvious structural configurations, notwithstanding the myriad of designs encompassed by the crowded prior art which has been developed for the fulfillment of countless objectives and requirements.

The prior art discloses a large number of devices for windshield wiper actuated headlights. By way of example, U.S. Pat. No. 5,202,581 to Moore discloses a windshield wiper and headlight control circuit. U.S. Pat. No. 5,120,981 to Cope discloses a windshield wiper system activated lighting. U.S. Pat. No. 5,250,850 to Pace et al. discloses an automotive light and wiper control circuit. U.S. Pat. No. 5,235,250 to Cronk discloses a windshield wiper light circuit with optional time delay. U.S. Pat. No. 5,231,331 to Meister discloses an automatic vehicle headlight\taillight control. Lastly, U.S. Pat. No. 5,205,634 to Ruter discloses a combined headlight and windshield wiper control.

While these devices fulfill their respective, particular objective and requirements, the aforementioned patents fail to describe windshield wiper actuated headlights including a first orientation for allowing activation of the headlights of an automobile via a headlight switch and further having a second orientation actuated by the activation of the windshield wipers allowing activation of the headlights and further allowing continued activation of the headlights upon deactivation of the windshield wipers when there is insufficient light.

In this respect, the light-governed windshield wiper and headlight control system according to the present invention substantially departs from the conventional concepts and designs of the prior art, and in doing so provides an apparatus primarily developed for the purpose of automatically actuating the headlights of an automobile upon activation of the windshield wipers and further precluding deactivation of the headlights upon deactivation of the windshield wipers when there is insufficient light.

Therefore, it can be appreciated that there exists a continuing need for a new and improved light-governed windshield wiper and headlight control system which can be used for automatically actuating the headlights of an automobile upon activation of the windshield wipers and further precluding deactivation of the headlights upon deactivation of the windshield wipers when there is insufficient light. In this regard, the present invention substantially fulfills this need.

SUMMARY OF THE INVENTION

In view of the foregoing disadvantages inherent in the known types of windshield wiper system actuated headlights now present in the prior art, the present invention provides an improved light-governed windshield wiper and headlight control system. As such, the general purpose of the present invention, which will be described subsequently in greater detail, is to provide a new and improved light-governed windshield wiper and headlight control system having all the advantages of the prior art and none of the disadvantages.

To attain this, the present invention essentially comprises a relay having a switching coil with a negative terminal thereof connected to ground. The relay further includes a first switching contact coupled to the headlights of an automobile and having a closed orientation when the switching coil is relaxed. The relay also includes a second switching contact coupled to an ignition actuator device which supplies direct current from a twelve volt power supply when closed. The second switching contact has an open orientation when the switching coil is relaxed. The relay finally includes a third switching contact coupled between the headlights and an auxiliary power source which supplies direct current from the auxiliary power source. The third switching contact has an open orientation when the switching coil is relaxed. The invention also includes a light-governed switching mechanism coupled between the second switching contact and switching coil of the relay. Such light-governed switching mechanism has an open orientation when exposed to sufficient light and a closed orientation when exposed to insufficient light thereby allowing continued excitation of the switching coil upon initial excitation thereof. The invention further comprises a single pole single throw headlight wiper switch coupled between the first switching contact of the relay and powersupply. The headlight switch has an open orientation for withholding current from the first switching contact of the relay and a closed orientation for allowing direct current to flow to the first switching contact of the relay thereby activating headlights when switching coil is relaxed. Lastly, the invention comprises a double pole single throw wiper switch having a first wiper switch contact coupled between the wiper blades and ignition actuator device and further comprising a second wiper switch contact coupled between the switching coil of the relay and the ignition actuator device. The wiper switch has an open orientation for withholding direct current and a closed orientation for allowing direct current to flow to the wiper blades, switching coil of the relay, and second switching contact of the relay. Such current flow thereby activates the windshield wipers and headlights coincidentally and further excites the switching coil hence continuing activation of the headlights when the wiper switch is deactivated and there is insufficient light.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved light-governed windshield wiper and headlight control system which has all the advantages of the prior art windshield wiper actuated headlights and none of the disadvantages.

It is another object of the present invention to provide a new and improved light-governed windshield wiper and headlight control system which may be easily and efficiently manufactured and marketed.

It is a further object of the present invention to provide a new and improved light-governed windshield wiper and headlight control system which is of a durable and reliable construction.

An even further object of the present invention is to provide a new and improved light-governed windshield wiper and headlight control system which is susceptible of a low cost of manufacture with regard to both materials and labor, and which accordingly is then susceptible of low prices of sale to the consuming public, thereby making such windshield wiper actuated headlights economically available to the buying public.

Still yet another object of the present invention is to provide a new and improved light-governed windshield wiper and headlight control system which provides in the apparatuses and methods of the prior art some of the advantages thereof, while simultaneously overcoming some of the disadvantages normally associated therewith.

Even still another object of the present invention is to provide a new and improved light-governed windshield wiper and headlight control system for automatically actuating the headlights of an automobile upon activation of the windshield wipers and further precluding deactivation of the headlights upon deactivation of the windshield wipers.

Lastly, it is an object of the present invention to provide a new and improved light-governed windshield wiper and headlight control system including a wiper switching mechanism coupled to windshield wipers having a first orientation allowing direct current to flow from a power source and a second orientation for withholding direct current therefrom. The invention also includes a headlight switching mechanism having a first orientation allowing direct current to flow from a power source and a second orientation for withholding direct current therefrom. A relay control mechanism is coupled between the wiper switching mechanism, headlight switching mechanism, power source, and headlights of an automobile. The relay control mechanism has a first orientation for allowing activation of the headlights via the headlight switching mechanism, and further has a second orientation actuated by the wiper switching mechanism for allowing coincident activation of the headlights and windshield wipers. Finally, a light-governed switch is coupled to the relay control mechanism allowing continued operation of the headlights despite deactivation of wiper switching mechanism when there is insufficient light.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 4:
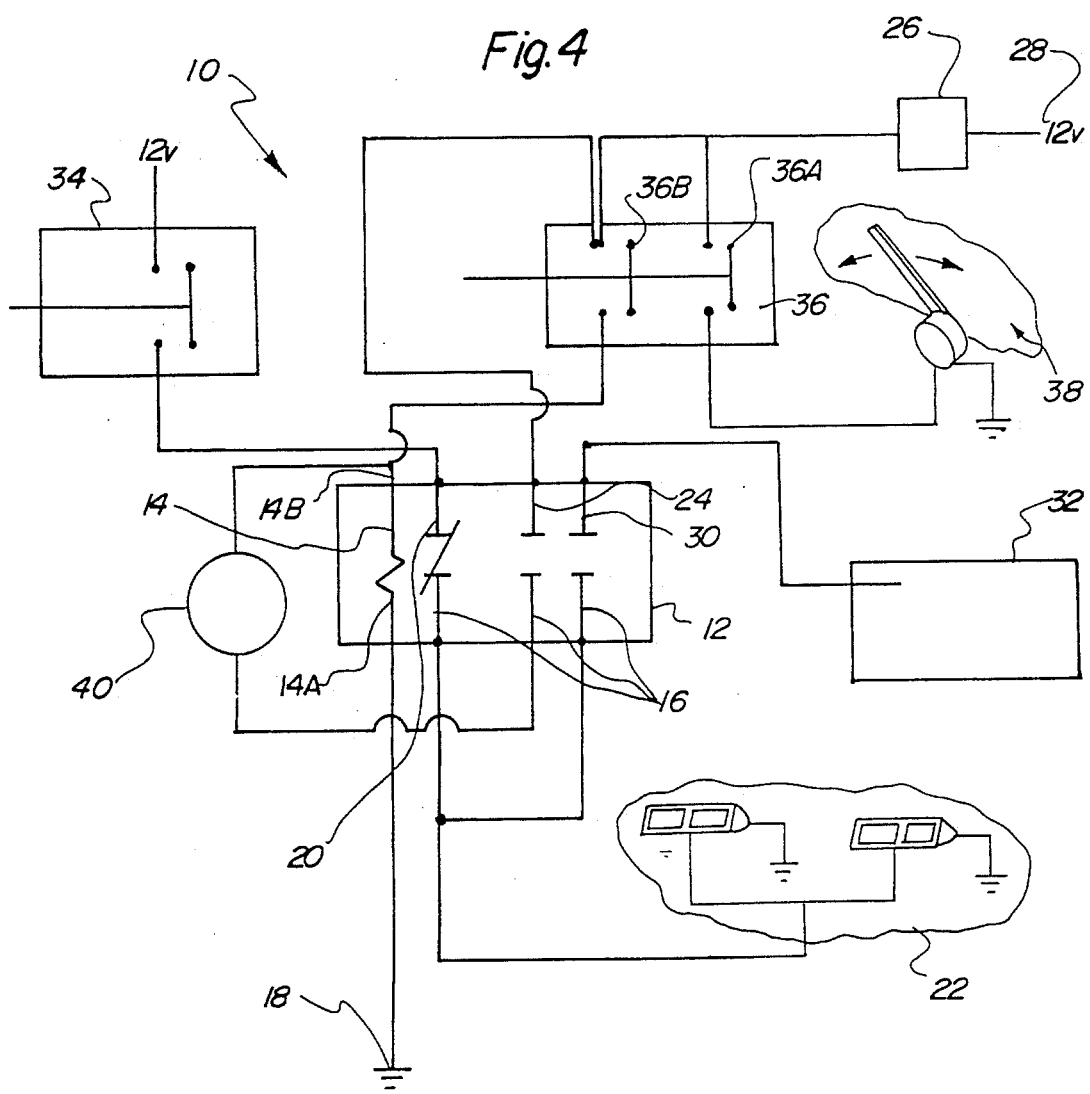
FIG. 4 is a schematic diagram of the preferred embodiment of the new and improved light-governed windshield wiper and headlight control system constructed in accordance with the principles of the present invention.

With reference now to the drawings, and in particular to FIG. 4 thereof, the preferred embodiment of the new and improved light-governed windshield wiper and headlight control system embodying the principles and concepts of the present invention and generally designated by the reference numeral 10 will be described.

The present invention, the new and improved light-governed windshield wiper and headlight control system comprises of a plurality of components. In their broadest context, the components include a relay, a single pole single throw headlight switch, and a double pole single throw wiper switch. Each of the individual components is specifically configured and correlated one with respect to the other so as to attain the desired objectives.

More specifically, the system 10 of the present invention includes an external twelve volt relay 12 having a common switching coil 14 and a plurality of switching contacts 16. The switching coil 14 comprises a negative terminal 14A coupled to the chassis of the automobile which constitutes a ground 18 and further includes a positive terminal 14B thereof. The plurality of switching contacts are positioned in close proximity of the switching coil effecting a change in orientation of the switching contact when the switching coil is excited.

Figure 1:
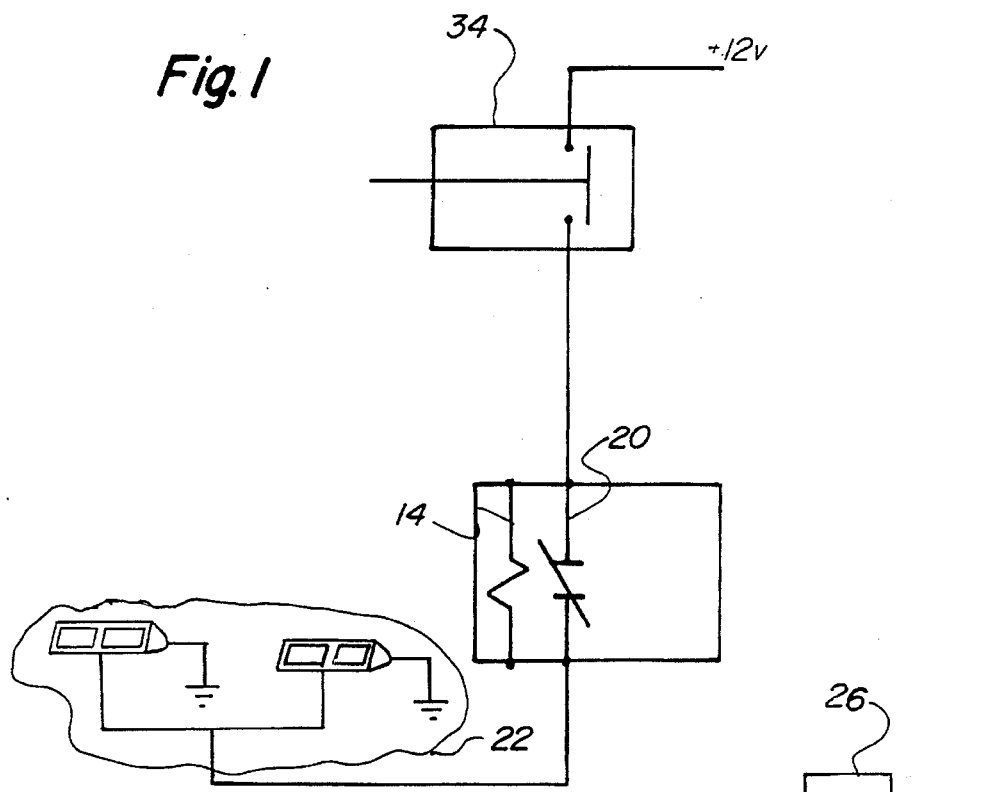
FIG. 1 is a partial schematic diagram depicting the amalgamation of a standard headlight switch and headlight of an automobile with the present invention.

A first switching contact 20 of the relay is coupled to the headlights 22 of an automobile and has a closed orientation when the switching coil is relaxed, as shown in FIGS. 1 and 4.

A second switching contact 24 of the relay is coupled to an ignition actuator device 26. The ignition actuator device supplies direct current from a twelve volt power supply 28 such as a car battery when the actuator device is in a closed orientation. The second switching contact has an open orientation when the switching coil is relaxed.

Figure 3:
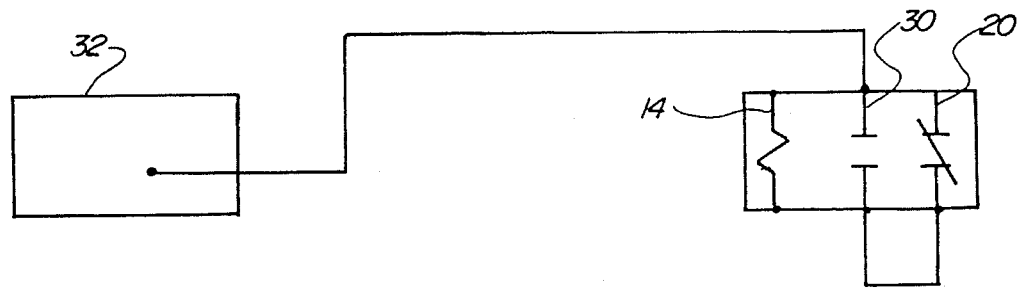
FIG. 3 is a partial schematic diagram depicting the amalgamation of a standard auxiliary power source of an automobile and the present invention.

Further included is a third switching contact 30 of the relay coupled between the headlights of the automobile and an auxiliary power source 32, as shown in FIGS. 3 and 4. The auxiliary power source supplies direct current from a twelve volt power supply such as a automobile battery. The third switching contact of the relay has an open orientation when the switching coil is relaxed.

Figure 2:
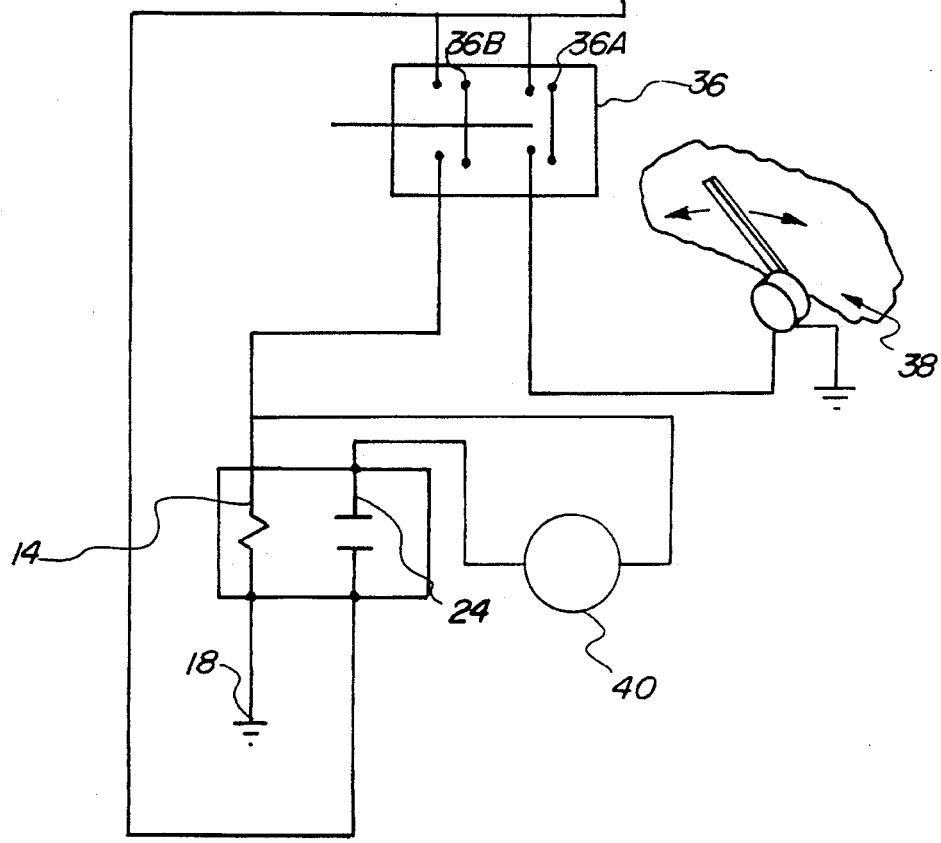
FIG. 2 is a partial schematic diagram depicting the amalgamation of standard windshield wipers of an automobile with the present invention.

A light-governed switching mechanism 40 is coupled between the second switching contact and switching coil of the relay, as shown in FIGS. 2 and 4. The light-governed switching mechanism has an open orientation when exposed to sufficient light thereby precluding current flow therebetween. The a light-governed switching mechanism further has a closed orientation when exposed to insufficient light thereby allowing continued excitation of the switching coil upon initial excitation of the switching coil.

A single pole single throw headlight switch 34 is coupled between the first switching contact of the relay and the twelve volt power supply, as shown. The headlight switch has an open orientation for withholding current from the first switching contact of the relay. The headlight switch further has a closed orientation for allowing direct current to flow to the first switching contact of the relay thereby activating the headlights when switching coil is relaxed.

Lastly, a double pole single throw wiper switch 36 includes a first wiper switch contact 36A and a second wiper switch contact 36B. The first wiper switch contact is coupled between the wiper blades 38 and ignition actuator device. The second wiper switch contact is coupled between the switching coil of the relay and the ignition actuator device, as shown in FIGS. 2 and 4. The double pole single throw wiper switch has an open orientation for withholding direct current and further has a closed orientation for allowing direct current to flow to the wiper blades, switching coil of the relay, and second switching contact of the relay.

Operation of the present invention is facilitated by the amalgamation of all the above components. The switching coil 14 of the relay begins operation in the relaxed orientation when the ignition actuation device 26 is first closed. In this orientation, the headlights of the automobile are directly controlled via the single pole single throw headlight switch 34. Upon engaging the double pole single throw wiper switch 36, the windshield wipers are activated via the power source 28 and the switching coil of the relay is excited hence shifting the orientation of the plurality of switching contacts 16. The shift in orientation, in turn, effects actuation of the headlights via the auxiliary power source. If there is insufficient light, the light-governed switching mechanism 40 closes thereby affixing the relay 12 in the present orientation through the feedback loop constructed by the second switching contact 24. Such a configuration, precludes deactivation of the headlights despite deactivation of the windshield wipers. The orientation will remain affixed until the light-governed switching means is opened as a result of exposure to sufficient light or until the ignition actuator device is opened effecting the switching coil to relax hence resetting it.

The present invention is ideally adapted to easily replace older light-governed windshield wiper and headlight control systems. The retrofitting first consists of installing the relay 12 and light-governed switching mechanism 40 in a position where the light-governed switching mechanism can monitor the amount of light in the surroundings. Such placement includes an automobile dashboard or an exterior grill. The first switching contact 20 of the relay is then coupled between the old headlight switch and headlights 22. This ensures continued conventional operation of the headlight switch 34 when the switching coil 142is in a relaxed state. The positive terminal 14B of the switching coil is then coupled to the ignition actuator device 26. Next, the common wiper switch is replaced with the double pole single throw wiper switch 36. The new wiper switch is coupled between the ignition actuator device and both the windshield wipers and second switching contact of the relay. Finally, the third switching contact is coupled between the auxiliary power source 32 and headlights.

Due to the increasing demand of highway safety, many states now have laws requiring automobile drivers to turn on their headlights when driving in adverse conditions. While driving in such conditions, activation of headlights is often overlooked both compromising the driver's safety and subjecting him to admonishment under many state laws. With the present invention, such risks are obviated. The driver's headlights are automatically actuated with the activation of the windshield wipers which are rarely forgotten. In addition, the invention precludes deactivation of the headlights despite deactivation of the windshield wipers when there is insufficient light. Hence, the present invention offers an unsurpassed invaluable measure which contributes to the safety and convenience of the automobile driver.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed as being new and desired to be protected by Letters Patent of the United States is as follows:

1. A new and improved light-governed windshield wiper and headlight control system comprising, in combination:

a relay having a switching coil with a negative terminal thereof connected to ground and further including:

a first switching contact coupled to the headlights of the automobile and having a closed orientation when the switching coil is relaxed, a second switching contact coupled to an ignition actuator device which supplies direct current from a power supply when closed, the second switching contact having an open orientation when the switching coil is relaxed, and a third switching contact coupled between the headlights of an automobile and auxiliary power source which supplies direct current from said auxiliary power source, the third switching contact having an open orientation when the switching coil is relaxed;

a light-governed switching means coupled between the second switching contact of the relay and switching coil of the relay, the light-governed switching means having an open orientation when exposed to sufficient light thereby precluding current flow therebetween and further having a closed orientation when exposed to insufficient light thereby allowing continued excitation of the switching coil upon initial excitation thereof;

a single pole single throw headlight switch coupled between the first switching contact of the relay and power supply, the headlight switch having an open orientation for withholding current from the first switching contact of the relay, the headlight switch further having a closed orientation for allowing direct current to flow to the first switching contact of the relay thereby activating the headlights when switching coil is relaxed;

a double pole single throw wiper switch having a first wiper switch contact coupled between a wiper blades circuit and ignition actuator device and further comprising a second wiper switch contact coupled between the switching coil of the relay and the ignition actuator device, the wiper switch having an open orientation for withholding direct current, the wiper switch further having a closed orientation for allowing direct current to flow to the wiper blades circuit, switching coil of the relay, and second switching contact of the relay thereby activating the windshield wipers and headlights coincidently and further exciting the switching coil hence continuing activation of the headlights when the windshield wipers are deactivated and there is insufficient light.

2. A new and improved light-governed windshield wiper and headlight control system comprising:

a headlight switching means having a first orientation allowing direct current to flow from a power source and a second orientation for withholding direct current therefrom;

a wiper switching means coupled to a windshield wipers circuit having a first orientation allowing direct current to flow from a power source and a second orientation for withholding direct current therefrom;

a relay control means coupled between the headlight switching means, wiper switching means, power source, and headlights of an automobile, the relay control means having a first orientation for allowing activation of the headlights via the headlight switching means and further having a second orientation actuated by the wiper switching means for allowing coincident activation of the headlights and windshield wipers and further allowing continued operation of the headlights despite deactivation of wiper switching means; and a light-governed switching means coupled to the relay control means and having a first orientation for allowing continued operation of the headlights despite deactivation of the headlights when there is insufficient light and further having a second orientation allowing the relay control means to return to the first orientation thereof upon deactivation of the wiper switching means;

wherein the wiper switching means comprises:

a double switch means having a first switch contact coupled between the windshield wipers circuit and power source and further comprising a second switch contact coupled between the relay control means and power source, the double switch means having an open orientation for withholding direct current, the double switch means further having a closed orientation for allowing direct current to flow to the windshield wipers circuit and relay control means thereby activating of the wipers and headlights coincidently.

* * * * *